Patented Apr. 3, 1951

2,547,519

UNITED STATES PATENT OFFICE 2,547,519

SYNTHESIS OF PTERIDINES

James H. Boothe, Pearl River, N. Y., assignor to American Cyanamid Company, New York, N. Y., a corporation of Maine No Drawing. Application July 27, 1946,
Serial No. 686,716

13 Claims. (Cl. 260—251.5)

1

This invention relates to a new method of preparing pteroylglutamic acid and related compounds.

The compound now known as pteroylglutamic acid, note Science, May 31, 1946, is identical with, or possesses the same properties as, naturally occurring folic acid. Because of this fact the compound is of great therapeutic value in the treatment of macrocytic anemias, sprue, and other deficiency diseases of the circulatory system. It is important, therefore, that chemical methods of synthesizing this product be made available.

Pteroylglutamic acid has been found to have the following chemical structure:

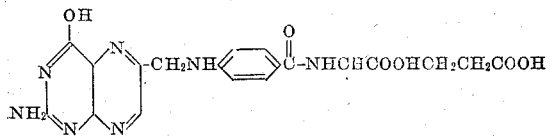

and, as such, may be designated N-[4-{[(2-amino - 4 - hydroxy - 6 - pteridyl)methyl]-amino}benzoyl] glutamic acid. This compound may also be called N-[4-{[(2-amino-4-hydroxy-6 - pyrimido[4,5 - b]pyrazyl)methyl] - amino}-benzoyl] glutamic acid. Because of the unwieldy nomenclature of this complex compound it will be referred to hereinafter by its simplified name, pteroylglutamic acid. Compounds having a fused pyrimido-pyrazyl ring structure are known as pteridines.

The new method of the present invention comprises, essentially, the step of mixing together a 2-amino-4-hydroxy-6-(halomethyl) pteridine, with para-aminobenzoic acid, or a salt, ester, or amide of para-aminobenzoic acid, such as, preferably, para-aminobenzoyl glutamic acid. The reaction is carried out by heating the reactants at a temperature preferably within the range 80° C. to 150° C. while dissolved or suspended in a solvent. Because of the ease with which the halogen substituent is hydrolyzed off it is preferred that the solvent be a non-aqueous liquid such as one of the alcohols or alkylene glycols or other inert liquid in which the reactants are reasonably soluble.

It is also preferred, but not necessary, that the para-aminobenzoyl glutamic acid be added in the form of one of its esters, such as the diethyl ester. This procedure is desirable in that the esters are more soluble in the preferred solvents and appear to be more reactive than the free amino acid amide. There is, also, less chance of side reactions.

Inasmuch as the 2-amino-4-hydroxy-6-(halomethyl) pteridines appear to be new compounds, a description of the preparation of the bromo and chloro derivatives will be given in the specific examples below.

Obviously, in place of the preferred para-aminobenzoylglutamic acid I may use para-aminobenzoic acid itself or a salt, ester, or amide thereof. The preferred amides are those of the amino acids, such as, specifically, para-aminobenzoylaspartic acid or para - aminobenzoylglycine or amides of amino acids having one or more peptid linkages, such as para-aminobenzoylglutamylglutamic acid.

To illustrate the invention with greater particularity, reference is made to the following specific examples in which the preferred product, pteroylglutamic acid, is prepared. It will be understood, of course, that these examples are merely illustrative of the process and are not to be construed as limiting the invention to the specific conditions or reactants shown. All parts are by weight unless otherwise indicated.

Example 1

200 parts of 2-amino-4-hydroxy-6-methyl pteridine, prepared by the process described in the copending application of John M. Mowat, Serial No. 633,870, filed December 8, 1945, now U. S. Patent 2,443,078, issued June 8, 1948, was mixed with 260 parts of bromine and heated in a sealed tube at 100° C. for 5 hours. The tube was then cooled, opened, and the 2-amino-4-hydroxy-6-(bromomethyl) pteridine was dried over KOH in a vacuum for 5 hours. This brominated product consisted of a mixture of 6-(mono- and di-bromomethyl) pteridines with some decomposition product.

The crude brominated product was mixed with 13 parts of dry ethylene glycol and 1 part of diethyl para-aminobenzoyl glutamate and heated for 1 hour at 100–110° C. The reaction mixture was then diluted with 24 parts of ethyl alcohol and the insoluble material separated, washed with alcohol and ether and dried. The product is the diethyl ester of pteroylglutamic acid.

The ester groups of the above product are very easily removed by hydrolysis; for example, by standing overnight at room temperature in a 0.1 N NaOH solution. The product, as obtained, is pteroylglutamic acid, which, upon further purification, may be employed as a therapeutic agent for conditions in which folic acid or L. casei factor are indicated as useful. A suitable purification procedure is described in the Science article referred to above.

*Example 2*

2 parts of 2-amino-4-hydroxy-6-methyl pteridine was sealed in a tube with 2.5 parts of bromine and heated to 150°–155° C. for 5 hours. The contents of the tube were dried over KOH for 24 hours in a vacuum. The product was then mixed with 110 parts of ethylene glycol and 10 parts of diethyl para-aminobenzoylglutamate and the solution heated at 100–110° C. for 1 hour. The reaction product was then diluted with 240 parts of ethyl alcohol, the mixture centrifuged and the insoluble product recovered and dried. After hydrolysis of the ester groups the crude product was further purified and found to be identical with pteroylglutamic acid by biological activity, ultra-violet and infra-red absorption spectra and crystallography tests.

*Example 3*

5 parts of 2-amino-4-hydroxy-6-methyl pteridine was refluxed with 167 parts of sulfuryl chloride in a small amount of benzoyl peroxide catalyst for 5 hours. The sulfuryl chloride was evaporated off and 1 part of diethyl para-aminobenzoyl glutamate in 11 parts of ethylene glycol was added to the crude 2-amino-4-hydroxy-6-(chloromethyl) pteridine and the mixture heated for 1 hour at 100–110° C. The mixture was diluted with alcohol and the product was recovered and dried as in the preceding examples. After hydrolysis of the ester groups, the crude product was examined and found to contain pteroylglutamic acid.

*Example 4*

12 grams of 2-amino-4-hydroxy-6-methyl pteridine was mixed with 500 cc. 48% hydrobromic acid and 12 cc. bromine was added. This mixture was heated on a steam bath under reflux for five hours when nearly all of the starting compound was in solution. After standing overnight the solution was concentrated in vacuo until all the excess bromine was removed. The solution was Norited, filtered and concentrated to about 30 cc. 2.5 liters of cold water was added and the product filtered out and dried.

4 grams of the above described crude bromomethyl pteridine was heated on a steam bath for three hours with 16 g. diethyl p-aminobenzoylglutamate in 300 cc. ethylene glycol. It was cooled and diluted with 1.2 liters of acetone. The precipitate was centrifuged and washed with acetone and ether and dried. It contained 25% pteroylglutamic acid by chemical assay.

*Example 5*

100 mg. of the above described crude bromomethyl pteridine was heated one hour on a steam bath with 200 mg. p-aminobenzoylglutamic acid in 6 cc. ethylene glycol. It was cooled and diluted with 24 cc. acetone and the product centrifuged, washed with acetone and ether, and dried. It contained 7.2% pteroylglutamic acid by chemical assay.

I claim:

1. A method of preparing pteridines which comprises mixing together and heating within the range 80° C. to 150° C. a 2-amino-4-hydroxy-6-halomethyl pyrimido [4,5-b] pyrazine with a member of the group consisting of para-aminobenzoic acid and its salts, esters and amides thereof and thereafter recovering the pteridine formed.

2. A method of preparing pteridines which comprises mixing together in a solvent and heating the mixture within the range 80° C. to 150° C. a 2-amino-4-hydroxy-6-bromomethyl pyrimido [4,5-b] pyrazine with a member of the group consisting of para-aminobenzoic acid and its salts, esters and amides thereof and thereafter recovering the pteridine formed.

3. A method of preparing pteridines which comprises mixing together in a substantially anhydrous hydroxylated solvent and heating the mixture within the range 80° C. to 150° C. a 2-amino-4-hydroxy-6-halomethyl pyrimido [4,5-b] pyrazine with a member of the group consisting of para-aminobenzoic acid and its salts, esters and amides thereof and thereafter recovering the pteridine formed.

4. A method of preparing pteridines which comprises mixing together in a substantially anhydrous hydroxylated solvent a 2-amino-4-hydroxy-6-halomethyl pyrimido [4,5-b] pyrazine with a member of the group consisting of para-aminobenzoic acid and its salts, esters and amides thereof and heating at a temperature within the range 80° C. to 150° C. and thereafter recovering the pteridine formed.

5. A method of preparing pteridines which comprises mixing together in a solvent and heating the mixture within the range 80° C. to 150° C. a 2-amino-4-hydroxy-6-halomethyl pyrimido [4,5-b] pyrazine with an amino acid amide of para-aminobenzoic acid and thereafter recovering the pteridine formed.

6. A method of preparing pteroylglutamic acid which comprises mixing together in a solvent and heating the mixture within the range 80° C. to 150° C. a 2-amino-4-hydroxy-6-halomethyl pyrimido [4,5-b] pyrazine with para-aminobenzoylglutamic acid and thereafter recovering pteroylglutamic acid.

7. A method of preparing pteroylglutamic acid which comprises mixing together in a solvent and heating the mixture within the range 80° C. to 150° C. a 2-amino-4-hydroxy-6-halomethyl pyrimido [4,5-b] pyrazine with the diethyl ester of para-aminobenzoylglutamic acid and thereafter recovering pteroylglutamic acid.

8. A method of preparing pteroylglutamic acid which comprises mixing together in an inert solvent and heating within the range 80° C. to 150° C. 2-amino-4-hydoxy-6-bromomethyl pyrimido [4,5-b] pyrazine and the diethyl ester of para-aminobenzoylglutamic acid and thereafter recovering pteroylglutamic acid.

9. A method of preparing pteroylglutamic acid which comprises mixing together in an inert solvent and heating within the range 80° C. to 150° C. 2-amino-4-hydroxy-6-bromomethyl pyrimido [4,5-b] pyrazine and para-aminobenzoylglutamic acid and thereafter recovering pteroylglutamic acid.

10. A method of preparing pteroylglutamic acid which comprises mixing together in a polyalkylene glycol and heating within the range 80° to 150° C. 2-amino-4-hydroxy-6-bromomethyl pyrimido [4,5-b] pyrazine and para-aminobenzoylglutamic acid and thereafter recovering pteroylglutamic acid.

11. A method of preparing pteroylglutamic acid which comprises mixing together in a polyalkylene glycol and heating within the range 80° to 150° C. 2-amino-4-hydroxy-6-bromomethyl pyrimido [4,5-b] pyrazine and a dialkyl ester of para-aminobenzoylglutamic acid and thereafter recovering pteroylglutamic acid.

12. A method of preparing pteridines which comprises mixing together in a solvent 2-amino-4-hydroxy-6-halomethyl pyrimido (4,5-b) pyrazine with an amino acid amide of para-aminobenzoic acid and recovering the pteridine formed.

13. A method of preparing pteroyl-glutamic acid which comprises mixing together in a solvent 2-amino-4-hydroxy-6-halomethyl pyrimido (4,5-b) pyrazine with para-aminobenzoylglutamic acid and recovering steroylglutamic acid.

JAMES H. BOOTHE.

No references cited.